United States Patent
Pestana et al.

(10) Patent No.: US 11,436,027 B2
(45) Date of Patent: Sep. 6, 2022

(54) IDENTIFYING ANALYTIC ELEMENT EXECUTION PATHS

(71) Applicant: OBSERVEPOINT, INC., Provo, UT (US)

(72) Inventors: John Raymond Pestana, Provo, UT (US); Robert K. Seolas, Alpine, UT (US); Tyler Broadbent, Lehi, UT (US); Dan Reno, Orem, UT (US); Gregory Larson, Orem, UT (US)

(73) Assignee: OBSERVEPOINT, INC., Provo, UT (US)

( * ) Notice: Subject to any disclaimer, the term of this patent is extended or adjusted under 35 U.S.C. 154(b) by 228 days.

(21) Appl. No.: 16/640,309

(22) PCT Filed: Aug. 21, 2018

(86) PCT No.: PCT/US2018/047329
§ 371 (c)(1),
(2) Date: Feb. 19, 2020

(87) PCT Pub. No.: WO2019/040496
PCT Pub. Date: Feb. 28, 2019

(65) Prior Publication Data
US 2021/0081212 A1    Mar. 18, 2021

Related U.S. Application Data

(60) Provisional application No. 62/548,539, filed on Aug. 22, 2017.

(51) Int. Cl.
*G06F 15/16*   (2006.01)
*G06F 9/448*   (2018.01)
*H04L 43/04*   (2022.01)

(52) U.S. Cl.
CPC .............. *G06F 9/448* (2018.02); *H04L 43/04* (2013.01)

(58) Field of Classification Search
CPC .... G06F 16/951; G06F 9/448; G06F 11/3006; G06F 7/06; G06F 11/3476; G06F 17/40;
(Continued)

(56) References Cited

U.S. PATENT DOCUMENTS

2006/0053421 A1   3/2006   Dickenson
2010/0107091 A1   4/2010   Amsterdam et al.
(Continued)

OTHER PUBLICATIONS

International Search Report and Written Opinion for Patent Cooperation Treaty application No. PCT/US2018/047329 dated Oct. 16, 2018.
(Continued)

*Primary Examiner* — John B Walsh
(74) *Attorney, Agent, or Firm* — Workman Nydegger (57) ABSTRACT

A computer system for identifying execution paths of analytic elements comprises computer-executable instructions that configure the computer system to identify an orphan analytic element and a second analytic element associated with a network-connected software application. The system can also be configured to identify, with a computer processor, one or more common attributes associated with the orphan analytic element and the second analytic element. Based upon the one or more common attributes, the computer system can identify an execution path for the orphan analytic element. Additionally, the system can be configured to execute, at the one or more computer processors, the network-connected software application, capture network communications generated by the network-connected software application, and generate observed execution paths based on the captured network communications. The system can additionally generate a report indicating the frequency (Continued)

of analytic element execution paths associated with the network-connected software application.

11 Claims, 5 Drawing Sheets

(58) Field of Classification Search
CPC ......... H04L 67/22; H04L 67/02; H04L 67/10; H04L 43/04; G06N 20/00; G06Q 30/0201; G06Q 30/02; G06Q 50/01
See application file for complete search history.

(56) References Cited

U.S. PATENT DOCUMENTS

| | | | |
|---|---|---|---|
| 2014/0280012 A1* | 9/2014 | Feuerlein | G06F 16/9566 707/709 |
| 2016/0048602 A1* | 2/2016 | Yastrebenetsky | H04L 67/02 715/234 |
| 2017/0075959 A1 | 3/2017 | Branson et al. | |

OTHER PUBLICATIONS

International Preliminary Report on Patentability for Application No. PCT/US2018/047329 dated Mar. 5, 2020.

\* cited by examiner

IDENTIFYING ANALYTIC ELEMENT EXECUTION PATHS

BACKGROUND OF THE INVENTION

Technical Field

Implementations of the present invention relate to network communication analysis.

Background and Relevant Art

As the Internet and the accompanying Internet commerce have expanded, various website owners have sought to track a variety of data about individuals who visit their websites and/or use their applications (in particular within the mobile application space). Website owners often wish to gather a variety of different analytic data about the visitors who view their webpage or use their applications. In many cases, this analytic data can be used to determine things such as what advertisements to display to a visitor and what fees should be paid to various external advertisers.

One conventional method for generating analytic data on website visitors is through the use of analytic elements (e.g., "tags"). As used here, an "analytic element" comprises a network request initiated by a client based upon content that is delivered to the client. Oftentimes, the analytic element can provide a system for tracking users of a network-connected software application. As used herein, a network-connected software application can comprise any application that accesses resources over a local or wide area network, such as an internet browser. In at least one conventional form such as when used in context of an internet web browser, a tag is a hidden element within a webpage that causes some action to occur on a webpage when it is fired. In particular, in at least one implementation, a tag is a piece of code that is placed within a webpage and allows a webpage owner to track information about the visitors who download and execute the particular piece of code. For example, a tag can comprise a transparent GIF or a tracking pixel, which is placed within the code of a webpage. The actual transparent GIF or tracking pixel can be stored on a separate server from the actual webpage. The tag is fired when the browser requests the transparent GIF or tracking pixel from the separate server. When the separate server receives the request from the browser, the server can gather various analytic data about the requestor.

Similar methods can also be used within applications to generate analytic data on the application users. For example, many applications, especially mobile applications, request data (e.g., via html code) from remote servers and display content within the application based upon the received data. The displayed content may take the form of in-game advertisements, video content, music content, and other similar content. Similar to the tags described above in webpages, tags can be executed within the application that allows a server to gather various analytic data about the application user.

Once executed, an analytic element can gather information such as the visitor's origination (e.g., the referring webpage or search engine), what keywords were used to find the webpage, whether a particular advertisement directed a visitor to the page, and other related data. In many situations, a single webpage can comprise multiple analytic elements from a variety of different parties. For example, a particular webpage may contain a GOOGLE Analytics tag, a FACEBOOK tag, a page-counter Tag, a weather tag, and other similar analytic elements.

Properly and efficiently tracking large websites with thousands to millions of unique analytic elements and applications with similarly large collections of analytic elements can be a tremendously challenging undertaking. Accordingly, there are a number of problems in the art relating to the creation of rules for a tag management system that can be addressed.

BRIEF SUMMARY OF THE INVENTION

Implementations of the present invention comprise systems, methods, and apparatuses configured to identify execution paths of analytic elements. In particular, implementations of the present invention comprise computer systems for simulating interactions with a target website. The simulated interaction can cause analytic elements to fire and communicate with external servers. The system can then analyze data received by the external servers and/or data observed from the simulated interaction to identify orphan analytic elements (along with other analytic elements) to map execution paths for the orphan (and/or the other) analytic elements.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to systems, methods, and apparatuses configured to identify execution paths of analytic elements. In particular, implementations of the present invention comprise computer systems for simulating interactions with a target website. The simulated interaction can cause analytic elements to fire and communicate with external servers. The system can then analyze data received by the external servers and/or data observed from the simulated interaction to identify orphan analytic elements (along with other analytic elements) to map execution paths for the orphan (and/or the other) analytic elements.

Accordingly, implementations of the present invention can significantly increase the reliability, utility, and consistency of network analytic information. For example, in some cases, a simulation and analysis of a network-connected software application may indicate that all analytic elements are properly firing and functioning. A review of the actual data being received by an external analytics server, however, may indicate that the server is not properly logging a target analytic element, some other error is occurring that is preventing the target analytic element from being properly logged, and/or additional orphan elements are being fired. As used herein, a "target analytic element" comprises an analytic element that was identified by the simulation of the network-connected software application but was not correctly logged by the remote analytics server. As used herein, an "orphan analytic element" comprises an analytic element that was identified by the simulation of the network-connected software application (or by other means described herein) that has an unidentified and/or non-linear execution path. Upon identifying a target analytic element and/or an orphan analytic element, implementations of the present invention can generate a report notifying a system administrator of the error. In some implementations, a mapping engine identifies one or more possible execution paths for orphan analytic elements and reports the same to a system administrator.

Additionally, the foregoing reports can comprise information indicating the configuration of the target/orphan analytic element within the network-connected software application and any information of interest that was found within the dataset of information from the remote analytic server. For example, implementations of the present invention can identify other analytic elements that are associated with the target analytic element. For instance, a network-connected software application may comprise any software application that receives data over a local or wide-area network, such as a web browser that is executing HTML code. The HTML code may comprise analytic elements in the form of HTML tags. An individual HTML webpage may comprise multiple tags. At least one implementation of the present invention can provide information about other tags that were detected on the same webpage as the target analytic element. A system administrator can utilize this information to determine if there were any errors with the other identified tags and based upon that determination attempt to correct any issues with the target/orphan analytic element, such as, for example, mapping execution paths for the target/orphan analytic elements.

Accordingly, implementations of the present invention can provide significant technical advancements within the field of analyzing analytic element network traffic. In particular, implementations of the present invention can determine that target analytic elements, which appear to be properly functioning, are in fact not being properly logged. Additionally, implementations of the present invention can provide an end-user with valuable information for correcting errors within target analytic elements. Additionally, implementations of the present invention can provide an administrator and/or an end-user a holistic view of the execution paths taken by analytic elements, which may aid in eliminating (or at the very least identifying) inconsistencies within a network. Additionally, implementations of the present invention can elucidate the distribution of data propagated by analytic elements, which may be useful, for example, in providing safeguards against unwanted data distribution. Additionally, implementations of the present invention can illustrate execution paths for analytic elements, which may assist a vendor and/or network administrator in increasing the efficiency of executing content within network-connected software applications on a computer system and/or the processing of network traffic associated therewith by coupling/combining reiterated portions of content.

Figure 1:
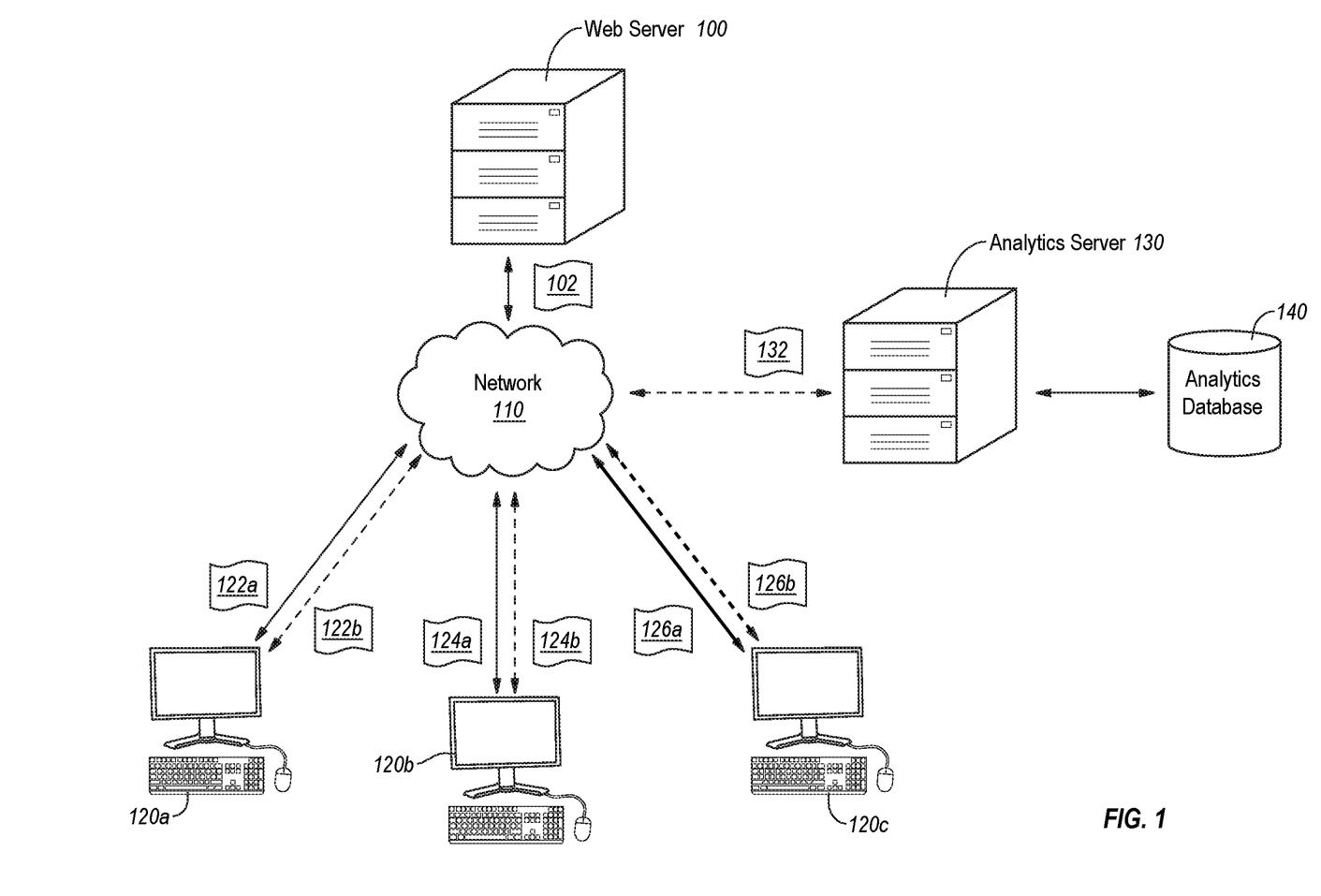
FIG. 1 illustrates a schematic of a network-based analytic element tracking system in accordance with implementations of the present invention.

Turning now to the figures, FIG. 1 illustrates a schematic of a network-based analytic element tracking system in accordance with implementations of the present invention. In particular, FIG. 1 depicts a group of end-user computers 120(a-c) in communication with a web server 100 through a network connection 110. One will understand that the depicted schematic is merely exemplary and that far more than three end-user computers 120(a-c) may be in communication with a web server 100 over a network connection 110. Additionally, in at least one implementation, mobile computing devices instead of, or in addition to, the end-user computers 120(a-c) can request data from the web server 100 through the network 110.

In at least one implementation, each end-user computer 120(a-c) requests 122a, 124a, 126a data from web server 100. The requests 122a, 124a, 126a may be generated from within web browsers, software applications, or any other location within the end-user computers 120(a-c). In response to the request 122a, 124a, 126a for data, the web server 100 may transmit back to each respective end-user computer 120(a-c) the requested data 122b, 124b, 126b, along with an analytic element 102.

In at least one implementation, the analytic element 102 can comprise an HTML tag, such as a transparent pixel request, that requests data from a remote analytics server 130. When executed, the analytic element 102 can cause the end-user computers 120(a-c) to each request data 122a, 124a, 126a from the remote analytics server 130. When receiving the requests 122a, 124a, 126a from the end-user computers 120(a-c), the analytics server 130 can log the requests 122a, 124a, 126a, log any associated variables, log various analytic information about the requests 122a, 124a, 126a, and store the information within an analytics database 140. The analytics server 130 can then communicate the transparent pixel 132, for example, to the end-user computers 120(a-c).

While the above description is provided with respect to HTML tags, in at least one implementation, the present invention can be easily adapted to alternative analytic tracking methods. For example, some analytic methods do not rely upon tags that fire requests to external servers. Instead, some analytic methods gather all of the analytic data of interest within the web server 100. In such a case, the web server 100 can store the gathered analytics data within the analytics database 140, which may be local to the web server 100.

Accordingly, FIG. 1 depicts a schematic of an implementation of a system for gathering analytic information. As depicted, the analytics server 130 can gather information from a large number of end-user computers 120(a-c) that are accessing a web server 100 (and accompanying website) of interest. Additionally, various different webpages hosted by the webserver 100 may comprise unique analytic elements that comprise various specific attributes such as, but not limited to, specific variables, specific names, specific paths, and other similar characteristics. Each of these specific attributes may be pre-determined by a website administrator in order to efficiently track the desired analytic information. For example, specific webpages may be associated with a language variable that can be stored within the analytics database 140. The language variable may be informative to the website administrator in identifying what language to generate new content in, what language advertisements should be provided in, and various other demographic specific determinations.

Figure 2:
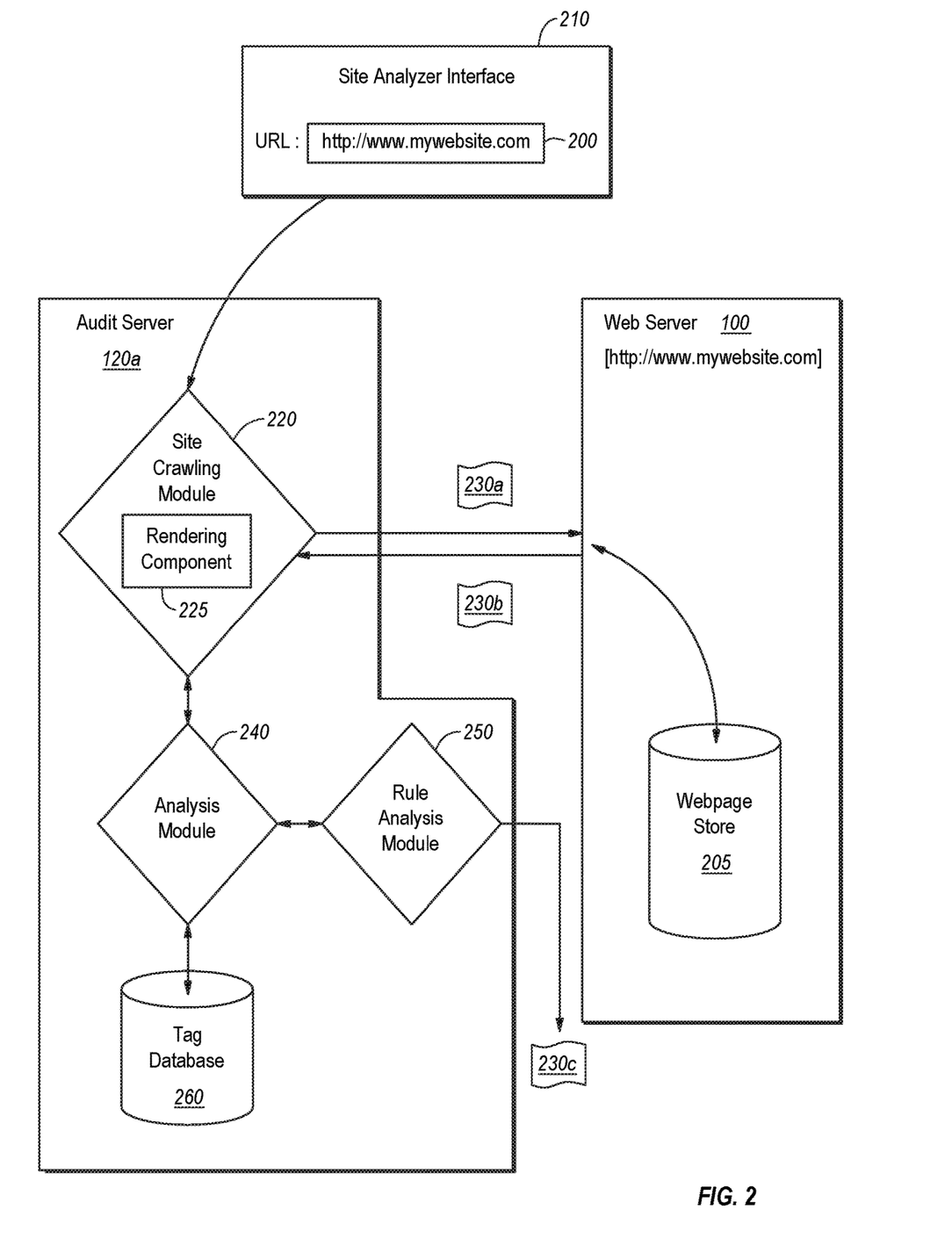
FIG. 2 illustrates a schematic of a network-based analytic element audit system in accordance with implementations of the present invention.

FIG. 2 illustrates a schematic of a network-based analytic element audit system in accordance with implementations of the present invention. The network-based analytic element audit system may be executed within an analytics server 130, a web server 100, or within an end-user computer 120a that is configured to audit webservers. For simplicity and clarity, the examples provided herein will relate to a network-based analytic element audit system executed by the end-user computer 120a. In at least one implementation, the network-based analytic element audit system can generate a site analyzer interface 210 at the end-user computer 120a (i.e., the analysis server). The audit server 120a receives from the site analyzer interface 210 a URL 200 to be analyzed. The audit server 120a comprises a site crawling module 220, an analysis module 240, a rule analysis module 250, and a tag database 260.

The audit server 120a can access the provided URL 200 and communicate with the web server 100 that is associated with the URL 200. As depicted in FIG. 2, the web server 100 can comprise a webpage store 205, where the actual website content is stored. For example, a webpage store 205 can store the source code of each webpage of a website. Additionally, a webpage store 205 can store multimedia content that is accessible through the webpages.

In FIG. 2 and throughout the present application, web server 100 is depicted and described as being a unitary system. One will understand, however, that a web server 100 can be composed of multiple servers and multiple webpage stores 205. In at least one implementation, the audit server 120a can access the webpage stores 205 on each of the servers that is associated with a particular webpage.

FIG. 2 shows that a user can enter a URL 200 into a site analyzer interface 210. The site analyzer interface 210 can then communicate the URL 200 to the audit server 120a. In this application, a URL 200 of "http://www.mywebsite.com" is used for exemplary purposes, but one will understand that any number of different URLs 200 can be entered into the site analyzer interface 210.

Once the audit server 120a has received the URL 200, the site crawling module 220 sends communication packets 230a to the web server 100 that is associated with the URL 200 and receives response communication packets 230b from the web server 100. In the depicted case, the site crawling module 220 accesses http://www.mywebsite.com. Specifically, the site crawling module 220 accesses the webpage store 205 that is associated with the web server 100. In at least one implementation, the site crawling module 220 can then crawl, using methods that are known in the art, through the entire website that is associated with URL 200.

In at least one implementation, the site crawling module 220 can include a rendering component 225. The rendering component 225 can render the information contained in the packets 230b that are received from the web server 100. For example, the rendering component 225 can render a JAVA or FLASH portion of a webpage. Once rendered, the site crawling module 220 can crawl the rendered portion of the webpage and identify additional tags that were not otherwise visible.

In some cases, crawling a rendered webpage may provide additional information than what would be available if only the source code is crawled. In particular, a particular webpage may contain multimedia content that contains attributes of interest that are only visible when the multimedia content is activated. In at least one implementation, the rendering component 225 can enable the site crawling module 220 to access these attributes of interest by rendering and activating at least a portion of the content that is embedded within a webpage that is stored within the webpage store 205.

As the site crawling module 220 crawls a website, the data 230b that is received from the webpage store 205 can be sent to the analysis module 240. The analysis module 240 can analyze the webpage content to identify tags that are associated with each webpage of the website. Additionally, in at least one implementation, the analysis module 240 can determine the configurations of identified tags. For example, in at least one implementation, the analysis module 240 can determine that specific variables are associated with a particular tag.

In at least one implementation, the analysis module 240 also receives rendered information from the rendering component 225 of the site crawling module 220. The analysis module 240 can analyze the rendered information and identify tags that are associated with a particular webpage. In particular, in at least one implementation, the analysis module 240 can identify a tag as the tag is executed. For example, the analysis module 240 may identify that a particular piece of code requests information from either an unidentified server or from a server that is known to be associated with tag products. Additionally, in at least one implementation, the analysis module 240 can determine the execution path of one or more identified tags. For example, in at least one implementation, the analysis module 240 can map an execution path of one or more identified tags as crawling module 220 crawls the website and activates attributes of the website.

Further, in at least one implementation, the analysis module 240 can identify tags that are associated with rich content or multimedia content. For example, in some multimedia files, tags are configured to fire at particular points in the multimedia file, allowing the multimedia provider to identify how much of a particular file was viewed. In at least one implementation, the analysis module 240 can analyze the entire multimedia file and identify the tags and configurations of tags that are associated with the multimedia file.

In at least one implementation, the analysis module 240 identifies the tags that are associated with each webpage by referencing a tag database 260. For instance, the analysis module 240 can compare the source code (or other attributes) of a particular website to all of the known tags within the tag database 260. For example, the analysis module 240 may analyze a particular webpage that contains a FACEBOOK tag. The analysis module 240 can compare the source code of the particular webpage to known tags that are contained within the tag database 260. The tag database 260 may contain a signature of the FACEBOOK tag. Using the signature for the FACEBOOK tag that is stored in the tag database 260, the analysis module 240 can identify that the particular webpage contains a FACEBOOK tag.

In at least one implementation, the signatures within the tag database 260 may be actual copies of the known tags. In another implementation, the signatures may be based upon specific attributes of tags, such that the analysis module identifies a tag by identifying the specific attributes within a portion of the data 230b communicated from the site crawling module 220.

Additionally, in at least one implementation, the tag database 260 may also contain characteristics that are associated with each tag. For example, the database may contain information about the variables, if any, that are commonly associated with specific tags. In addition, the tag database 260 may also contain information about past version of tags, such that the analysis module 240 can identify whether a particular tag is up-to-date. Further, in at least one implementation, the tag database 260 may contain information that enables the analysis module 240 to identify undesirable tags (e.g., tags that are deemed unsecure, tags that steal user information, etc.).

Figure 3:
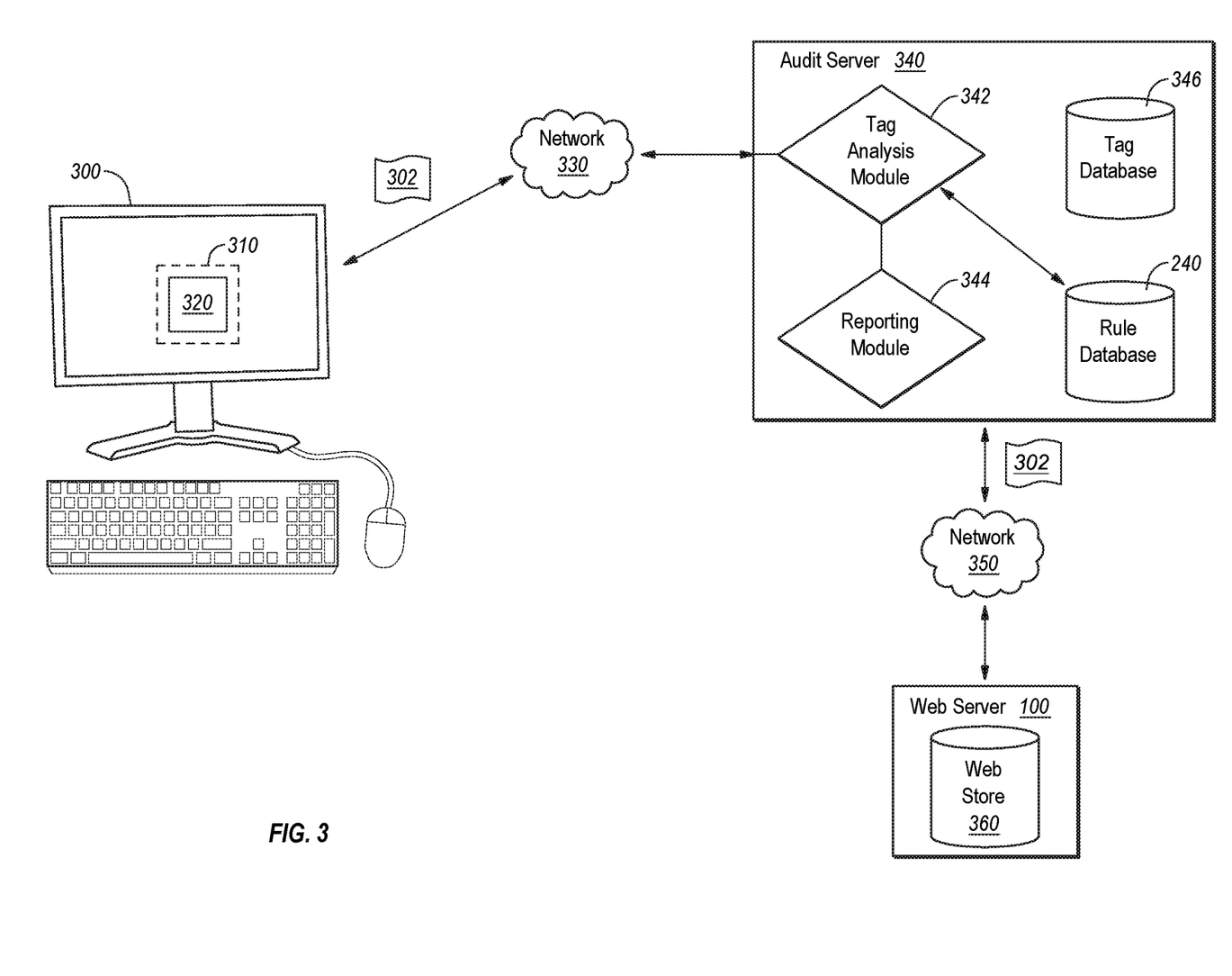
FIG. 3 illustrates a schematic of another network-based analytic element audit system in accordance with implementations of the present invention.

FIG. 3 illustrates a schematic of another network-based analytic element tracking system in accordance with implementations of the present invention. The schematic of FIG. 3 has been simplified to only show portions of interest. The network-based analytic element tracking system of FIG. 3 may comprise a system for analyzing web-connected software applications. For example, in at least one implementation, a mobile application 320 can be executed on an end-user computer 300 within a virtual machine 310. The network communications 302 generated by the mobile application 320 can be routed through an audit server 340. In at least one implementation, the audit server 340 functions as a network proxy for network communications 302 generated by the mobile application 320. While FIG. 3 depicts the end-user computer 300 and the mobile application 320 in communication with the audit server 340 through a network communication channel, in at least one implementation, the audit server 340 is executed within the same end-user computer 300 as the virtual machine 310 and the mobile application 320.

When functioning as a proxy for the mobile application 320, the audit server 340 can receive network communications 302 from the mobile application 320, analyze the communications for analytic elements, and then forward the communications 302 to its intended web server destination 100. The web server 100 may then gather data from a web store 360 and communicate the data to the audit server 340, which in turn can communicate the data to the mobile application 320.

When analyzing the network communications 302, the audit server 340 may utilize a tag analysis module 342 that identifies analytic elements (e.g., tags) based upon signatures found in the network communications 302. The signatures may be stored within a tag database 346. Additionally, the tag analysis module 342 can identify variables and other characteristics associated with each identified analytic element.

Accordingly, implementations of the present invention comprise various different systems and methods for auditing analytic elements within a network-connected software application. In particular, implementations of the present invention can identify analytics elements within the source code and network communications of the network-connected software application. The identified analytics elements can be audited for functionality and compliance with client provided guidelines.

Once analytic elements are identified and audited, implementations of the present invention can access a dataset of information stored at the analytics database 140. The dataset of information may comprise all, or a portion, of the analytic data gathered by the analytics server 130. The dataset may also be specific to analytic elements associated with the web server 100. For instance, the analytics server 130 may receive analytic data from a large number of different customers. As such, the dataset may comprise all of the analytics data received by the analytics server 130 for the particular web server of interest 100, which may also comprise the web server 100 that was audited by audit server 120a.

In at least one implementation, the audit server 120a receives the dataset from the analytics server 130. The analysis module 240 within the audit server 120a can then search the dataset analytic element entries that correspond to each analytic element identified in the audit. For example, the analysis module 240 may have identified an analytic element that fired from a particular page, the identified analytic element may have comprised a specific path variable, language variable, and date stamp. The audit server 120a can determine whether the identified analytic element is correctly accounted for in the dataset, not present within the dataset, or incorrectly accounted for in the dataset.

In the case that the analytic element is not present in the dataset or incorrectly accounted for in the dataset, the audit server 120a can generate a report 230c that indicates the error. For example, the audit server 120a can generate a report that indicates that the specific analytic element identified in the audit was not found in the dataset. Similarly, the audit server 120a can generate a report that the analytic element was incorrectly accounted in the dataset. For instance, the dataset may correctly state the language variable and time stamp, but neglect or incorrectly display the path associated with the analytic element.

Additionally, in at least one implementation, the audit server 120a can provide trouble-shooting information relating to an incorrectly accounted for analytic element. For example, the audit server 120a can identify other analytic elements on the same page as the incorrectly accounted for analytic element. The audit server 120a can also determine if the other analytic elements were properly accounted for. In the case that the other analytic elements were properly accounted for, the audit server 120a can determine that the page was functioning correctly and that the problem is specific to the incorrectly accounted for analytic element.

In one or more implementations of the present invention, problems identified, as stated above, can include analytic elements that are unaccounted for or analytic elements that appear to be orphaned. As used herein, and as previously defined, the term "orphan analytic element" comprises an analytic element that was identified by a simulation of a network-connected software application that has an unidentified and/or non-linear execution path. As used herein, an unidentified execution path encompasses those analytic elements that are seemingly unaccounted in an audit dataset. Additionally, as used herein, a non-linear execution path comprises execution paths that fail to follow a prescribed execution path established in a tag plan by an administrator or other similar theoretical and/or expected execution path. That is, for example, an analytic element having a non-linear execution path may be piggybacking one or more executable elements located on an execution path of a separate analytic element to initiate the requisite network request. An orphaned analytic element can additionally comprise analytic elements that are unaccounted for in an audit dataset.

As described above, execution of analytic elements in a real-time or simulated environment can provoke a different outcome than expected from, for example, a review of the relevant source code or analytic element plan established by a website administrator. In some implementations, an analytic element appears in the dataset but the path is incorrect or unidentifiable based on the information provided by the dataset. This type of error is one example of an orphaned analytic element. Another example may be when an analytic element is observed during simulation/execution of content on the network-connected software application. Advantages of understanding and being able to map the execution paths of orphaned analytic elements are obvious to those having ordinary skill in the art; nonetheless, a non-limiting list of advantages are recited farther above.

Figure 4:
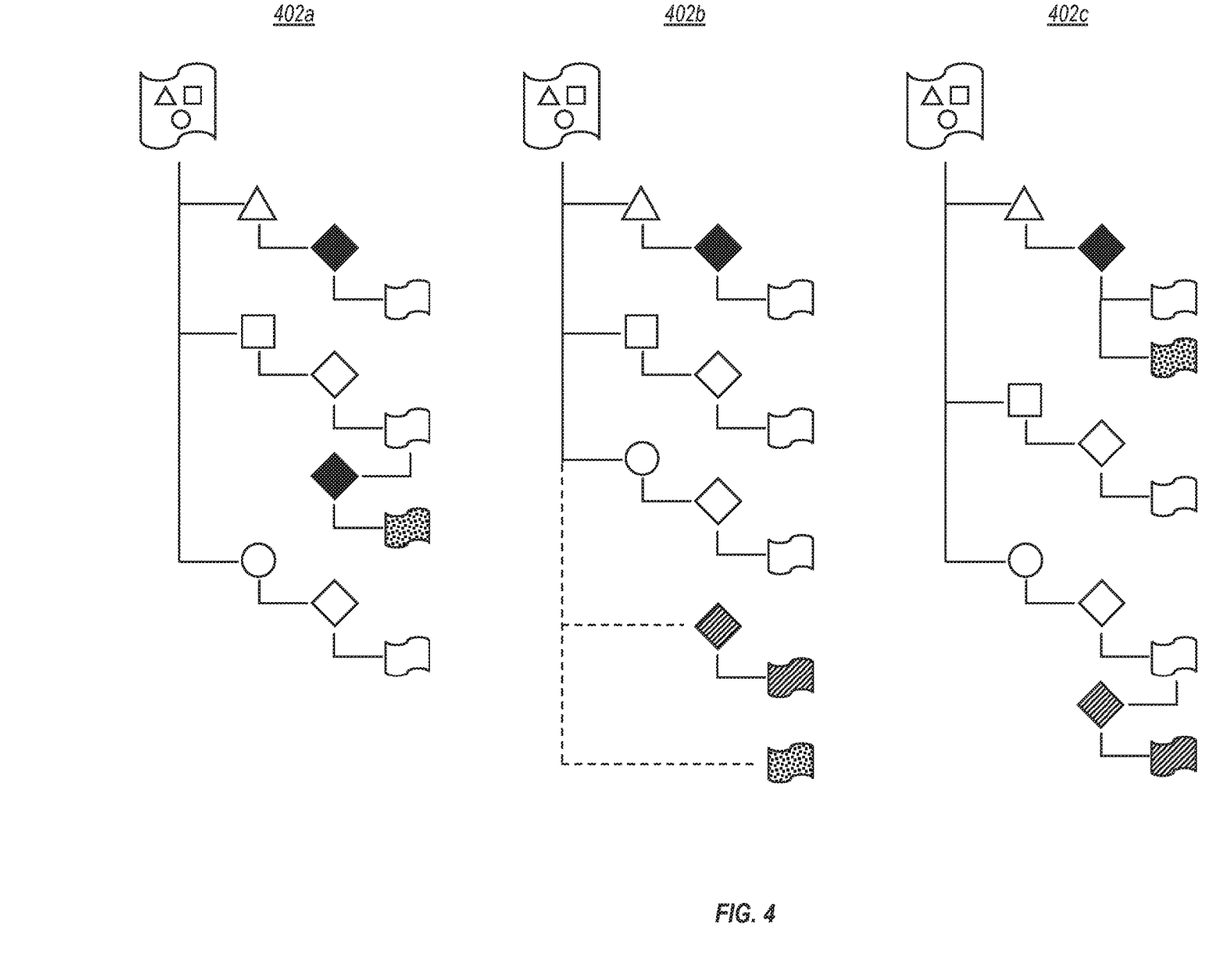
FIG. 4 illustrates a schematic of three exemplary hierarchical execution paths in accordance with implementations of the present invention.

Referring now to FIG. 4, illustrated are three execution paths: an expected execution path 402a, an observed execution path 402b, and a mapped execution path 402c. As illustrated in FIG. 4, each of the execution paths 402a, 402b, 402c illustrate execution of the same content. For the sake of clarity and simplicity, the content illustrated in FIG. 4 comprises three portions of content (illustrated as a triangle, square, and circle), executable elements (illustrated as rhombuses), and analytic elements (illustrated as horizontal scrolls). Though not specifically illustrated in FIG. 4, it should be appreciated that in some implementations, the content, itself, may call an analytic element without an intermediate executable element. In one or more implementations, the content illustrated in FIG. 4 may be website content received and at least partially executed at a user-computer system 120 operating a network-connected software application (e.g., a website browser), and the content may be sent over network 110 from web server 100. However, it should be understood that the scope of the present invention is not limited to identifying execution paths of analytic elements within three portions of content. To the contrary, implementations of the present invention may be practiced en masse, at scale, and over time to provide an aggregated view of the frequency by which one or more execution paths are utilized.

The expected execution path 402a may, in one implementation of the present invention, be derived from source code or it may additionally, or alternatively, be an expected analytic element plan established by a network and/or content administrator. As illustrated by FIG. 4, a first portion of content (i.e., the triangle), when executed, is expected to call an executable element (i.e., the darkened rhombus connected to the triangle) that, in turn, calls an analytic element (i.e., the horizontal scroll connected to the darkened rhombus). This connected path represents the execution path for the given analytic element associated with the first portion of content.

Similarly, the second portion of content (i.e., the square), when executed, is expected to call a first analytic element (i.e., the empty scroll), through a first executable element (i.e., the empty rhombus connected to the square), which then calls a second executable element (i.e., the darkened rhombus connected to the triangle) that, in turn, calls a second analytic element (i.e., the darkened scroll). Of note, the two analytic elements called by the second portion of content are, as illustrated, different analytic elements. In one implementation, the analytic elements may be the same. Additionally, the second executable element called in the second portion of content is the same type of executable element (e.g., the same source code, the same file, the same JAVA or FLASH element, etc.) as the executable element in the first portion of content.

As further depicted by the expected execution path 402a, a third portion of content (i.e., the circle), when executed, is expected to call an executable element (i.e., the empty rhombus connected to the circle) that, in turn, calls an analytic element (i.e., the empty scroll). The expected execution path may be derived by any means discussed above.

The expected execution path 402a is different than the observed execution path 402b. For example, the execution path associated with the second portion of content is not observed as calling the second executable element even though its associated analytic element (i.e., the polka-dotted horizontal scroll) was observed as being called. Thus, as depicted in the observed execution path 402b, the foregoing analytic element is representative of an orphan analytic element—an analytic element that may, for example, be accounted for in a dataset but not have a known execution path.

The observed execution path 402b, also illustrates a second orphan analytic element (i.e., the striped horizontal scroll) associated with an executable element that is seemingly unconnected to any of the three portions of executed content. In some implementations, this type of orphan analytic element is reminiscent of an analytic element that is unaccounted for in the expected execution path (e.g., the path gleaned from source code) yet is nonetheless observed when the content is executed.

The foregoing exemplary discrepancies between the expected and observed execution paths may, as indicated above, be reported. Alternatively, or additionally, implementations of the present invention may identify an execution path incorporating one or more orphan analytic elements. In some embodiments, a mapping engine is used to identify the execution path for one or more orphan analytic elements. The mapping engine may be software, hardware, or a combination of software and hardware, as known in the art.

As illustrated in the mapped execution path 402c, execution paths were identified for each of the orphan analytic elements identified in the observed execution path 402b. With respect to the polka-dotted analytic element, it was called by piggybacking the executable element associated with the first portion of content (i.e., the darkened rhombus). As stated earlier, the executable element of the first portion of content is the same as the second executable element of the second portion of content, and instead of executing the same element twice, the network-connected software application streamlined the processes and piggybacked the functionality of the executable element from the first portion of content to call the second analytic element of the second portion of content (i.e., the polka-dotted analytic element). In doing so, however, an analysis of the dataset obtained from the analytics server made it appear as though there was an error. For example, the reiterated executable element may be a GOOGLE ANALYTICS executable element that, when executed within a given content path calls an account-specific analytic element. Thus, with reference to the expected execution path 402a, the executable element representative of GOOGLE ANALYTICS in the first portion of content calls a GOOGLE ANALYTICS tag for Account A whereas the executable element representative of GOOGLE ANALYTICS in the second portion of content calls a GOOGLE ANALYTICS tag for Account B. Instead of running both instances of GOOGLE ANALYTICS separately, the network-connected software application may choose to run only one of them and piggyback its functionality to call both tags. Analogizing to the illustrative example of FIG. 4, the first portion of content calls both GOOGLE ANALYTICS accounts A and B through the first executable element representative of GOOGLE ANALYTICS.

In some implementations, the execution path may be different between pages of a website or between time periods. Implementations of the present invention allow a global or aggregate view of the frequency of various execution plans. For example, a GOOGLE ANALYTICS tag for Account B may be piggybacked through the GOOGLE ANALYTICS executable element in the first portion of content 90% of the time and through the expected route 10% of the time.

With respect to the other orphan analytic element (i.e., the striped horizontal scroll), the mapping engine identified that this analytic element was called by an associated executable element (i.e., the striped rhombus), which was, in turn, called by the analytic element of the third portion of content. In some implementations, this can be representative of a redirect issued by the external server with which an analytic element issues a network request. The redirect instructs the analytic element and/or associated executable element to call an additional executable element and/or analytic element. A redirect like this may be seen, for example, when there is a back-end relationship between the two executable elements and/or analytic elements. For example, a GOOGLE ANALYTICS tag may be instructed to redirect (and pass along the same and/or similar information) to a DOUBLECLICK executable element and/or tag, as DOUBLECLICK is a subsidiary of GOOGLE.

In one implementation, execution paths for orphan analytic elements may be identified using a HAR file, or similar information. Additionally, or alternatively, the execution path may be identified using a network response association, as described above. That is, in some implementations, the present invention can identify execution paths for orphan analytic elements during a simulated and/or live network response association and/or can do so using stored network response information. In at least one implementation, one or more common attributes between the orphan analytic element and secondary analytic elements (e.g., the same executable elements, the same server with which their respective requests will be made, or others implicitly and/or explicitly described herein) may aid in identifying one or more execution paths of orphan analytic elements.

In one implementation, execution paths for orphan analytic elements may be identified using a JAVASCRIPT stack trace.

One will understand that there are a variety of different diagnostic functions that the audit server 120a can perform on the dataset based upon the previously ran audit and/or a currently running audit. Additionally, one will understand that the analysis of both the dataset and the audit information need not be performed at the audit server 120a. For example, in at least one implementation, the analytics server 130 can perform the analysis based upon audit information received from the audit server 120a.

Accordingly, FIGS. 1-4 and the corresponding text illustrate or otherwise describe one or more components, modules, and/or mechanisms for auditing rules for network-based analytic elements and identifying execution paths for analytic elements. In particular, in at least one implementation, the present invention can analyze a dataset of analytic information in view of a previously executed audit. Comparing the audit information to the dataset information can identify previously undetectable problems and may additionally, or alternatively, identify one or more execution paths for one or more orphan analytic elements. One will appreciate that implementations of the present invention can also be described in terms of flowcharts comprising one or more acts for accomplishing a particular result. For example, FIG. 5 and the corresponding text describe acts in a method for identifying execution paths for analytic elements. The acts of FIG. 5 are described below.

Figure 5:
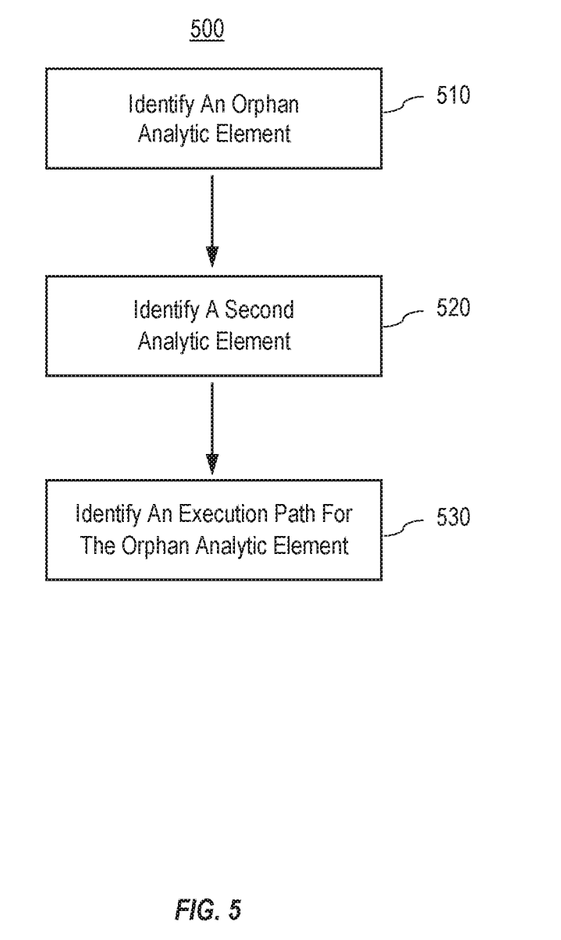
FIG. 5 illustrates a flow chart of a series of acts in a method in accordance with an implementation of the present invention to identify execution paths of analytic elements.

For example, FIG. 5 illustrates that a method 500 for identifying execution paths of analytic elements can include an act 510 of identifying an orphan analytic element. Act 510 can comprise identifying an orphan analytic element associated with a network-connected software application, wherein the orphan analytic element comprises a first network request initiated by the computer system based upon at least a first portion of content that is delivered to the computer system. For example, the audit server 120a can generate a report 230c that indicates to a system administrator that a particular analytic element is an orphan analytic element.

Additionally, FIG. 5 illustrates that the method for identifying execution paths of analytic elements can include act 520 of identifying a second analytic element. Act 520 can comprise identifying a second analytic element associated with the network-connected software application, wherein the second analytic element comprises a second network request initiated by the computer system based upon at least a second portion of content that is delivered to the computer system, and one or more common attributes associated with the orphan analytic element. For example, in FIG. 2 and the associated description, an analysis module 240 identifies tag signatures within the source code of a webpage.

Further, FIG. 5 shows that the method can include an act 530 of identifying an execution path for the orphan analytic element. Act 530 can comprise identifying an execution path for the orphan analytic element based on the one or more common attributes. For example, FIG. 2 depicts an analysis module 240 that can search the dataset for analytic information that corresponds to analytic elements identified during an audit and.

Accordingly, implementations of the present invention provide a system that can both audit the front-end of a web-connected software application and the back-end received analytic information data. As such, implementations of the present invention provide significant technical improvements to the field of network communication management. For example, implementations of the present invention provide a system administrator with information relating to analytic elements that would not otherwise be available.

Additionally, implementations of the present invention increase the reliability of analytics information by ensuring that each analytic element is properly logged. One of skill in the art will understand that incorrectly-logged analytic elements may lead to lost data, incorrect data, and other such problems within the resulting analytics.

Although the subject matter has been described in language specific to structural features, modules, and/or methodological acts, it is to be understood that the subject matter defined in the appended claims is not necessarily limited to the described features, modules, or acts described above, or the order of the acts described above. Rather, the described features, modules, and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer system for identifying execution paths of analytic elements comprising:

one or more processors;
one or more storage devices having stored thereon computer-executable instructions that when executed by the one or more processors configure the computer system to perform at least the following:
identify an orphan analytic element associated with a network-connected software application, wherein the orphan analytic element comprises a first network request initiated by the computer system based upon at least a first portion of content that is delivered to the computer system;
identify a second analytic element associated with the network-connected software application, wherein the second analytic element comprises:
a second network request initiated by the computer system based upon at least a second portion of content that is delivered to the computer system, and
one or more common attributes associated with the orphan analytic element;
identify an execution path for the orphan analytic element based on the one or more common attributes
identify one or more computer-executable elements associated with each of the orphan analytic element and the second analytic element that when executed by the one or more processors cause the computer system to generate the first network request and the second network request;
execute, at the one or more processors, the network-connected software application;
capture network communications generated by the network-connected software application;
generate observed execution paths based on the captured network communications;
receive, at the computer system, source code for the network-connected software application;
identify one or more expected execution paths based on the source code; and
analyze, at the one or more processors, the observed execution paths and the one or more expected execution paths.

2. The computer system as recited in claim 1, wherein at least one of the one or more common attributes comprises a computer executable element in communication with a same destination server receiving the first network request and the second network request.

3. The computer system as recited in claim 1, further comprising computer-executable instructions that configure the computer system to perform at least the following:
generate a report indicating a frequency of one or more execution paths of analytic elements associated with the network-connected software application.

4. The computer system as recited in claim 1, wherein the orphan analytic element is fired from within a multimedia file.

5. A computerized method comprising computer-executable instructions that when implemented at a computer system that includes one or more processors, perform a method for identifying execution paths of analytic elements, the computerized method comprising:
identifying an orphan analytic element associated with a network-connected software application, wherein the orphan analytic element comprises a first network request initiated by the computer system based upon at least a first portion of content that is delivered to the computer system;
identifying a second analytic element associated with the network-connected software application, wherein the second analytic element comprises:
a second network request initiated by the computer system based upon at least a second portion of content that is delivered to the computer system, and
one or more common attributes associated with the orphan analytic element;
identifying an execution path for the orphan analytic element based on the one or more common attributes;
executing, at the one or more processors, the network-connected software application;
capturing network communications generated by the network-connected software application;
generating observed execution paths based on the captured network communications;
receiving, at the computer system, source code for the network-connected software application;
identifying one or more expected execution paths based on the source code; and
analyzing, at the one or more processors, the observed execution paths and the one or more expected execution paths.

6. The computerized method as recited in claim 5, wherein at least one of the one or more common attributes comprises a computer executable element in communication with a same destination server receiving the first network request and the second network request.

7. The computerized method as recited in claim 5, further comprising identifying one or more computer-executable elements associated with each of the orphan analytic element and the second analytic element that when executed by the one or more processors cause the computer system to generate the first network request and second network request.

8. The computerized method as recited in claim 5, further comprising:
generating a report indicating a frequency of one or more execution paths of analytic elements associated with the network-connected software application.

9. The computerized method as recited in claim 5, wherein the orphan analytic element is fired from within a multimedia file.

10. A computer program product comprising one or more hardware storage devices having stored thereon computer-executable instructions that are executable by one or more processors of a computer system and that, when executed by the one or more processors, cause the computer system to identify execution paths of analytic elements, including computer-executable instructions that configure the computer system to perform at least the following:
identify an orphan analytic element associated with a network-connected software application, wherein the orphan analytic element comprises a first network request initiated by the computer system based upon at least a first portion of content that is delivered to the computer system;
identify a second analytic element associated with the network-connected software application, wherein the second analytic element comprises:
a second network request initiated by the computer system based upon at least a second portion of content that is delivered to the computer system, and
one or more common attributes associated with the orphan analytic element; and
identify an execution path for the orphan analytic element based on the one or more common attributes;

identify one or more computer-executable elements associated with each of the orphan analytic element and the second analytic element that when executed by the one or more processors cause the computer system to generate the first network request and second network request;

execute, at the one or more processors, the network-connected software application;

capture network communications generated by the network-connected software application;

generate observed execution paths based on the captured network communications;

receive, at the computer system, source code for the network-connected software application;

identify one or more expected execution paths based on the source code; and analyze, at the one or more processors, the observed execution paths and the one or more expected execution paths.

11. The computer program product as recited in claim 10, wherein at least one of the one or more common attributes comprises a computer executable element in communication with a same destination server receiving the first network request and the second network request.

* * * * *